(12) United States Patent
Alibay et al.

(10) Patent No.: US 11,915,438 B2
(45) Date of Patent: *Feb. 27, 2024

(54) METHOD AND APPARATUS FOR DEPTH-MAP ESTIMATION OF A SCENE

(71) Applicant: STMicroelectronics France, Montrouge (FR)

(72) Inventors: Manu Alibay, Alfortville (FR); Olivier Pothier, Sceaux (FR); Victor Macela, Paris (FR); Alain Bellon, Grenoble (FR); Arnaud Bourge, Paris (FR)

(73) Assignee: STMicroelectronics France, Montrouge (FR)

( * ) Notice: Subject to any disclaimer, the term of this patent is extended or adjusted under 35 U.S.C. 154(b) by 74 days.

This patent is subject to a terminal disclaimer.

(21) Appl. No.: 17/478,643

(22) Filed: Sep. 17, 2021

(65) Prior Publication Data

US 2022/0005214 A1 Jan. 6, 2022

Related U.S. Application Data

(60) Division of application No. 16/548,138, filed on Aug. 22, 2019, now Pat. No. 11,138,749, which is a (Continued)

(30) Foreign Application Priority Data

Feb. 27, 2017 (FR) ....................... 1751539

(51) Int. Cl.
*G06T 7/521* (2017.01)
*G01S 17/08* (2006.01)
(Continued)

(52) U.S. Cl.
CPC .............. *G06T 7/521* (2017.01); *G01S 17/08* (2013.01); *G06T 7/55* (2017.01); *G06T 7/593* (2017.01);
(Continued)

(58) Field of Classification Search
CPC ........... G06T 7/521; G06T 7/55; G06T 7/593; G06T 2207/10012; G06T 2207/10021;
(Continued)

(56) References Cited

U.S. PATENT DOCUMENTS

2009/0128833 A1 5/2009 Yahav
2011/0007132 A1 1/2011 Redmann et al.
(Continued)

FOREIGN PATENT DOCUMENTS

CN 102204259 A 9/2011
CN 102484736 A 5/2012
(Continued)

OTHER PUBLICATIONS

Gandhi et al, ("High-Resolution Depth Maps Based on TOF—Stereo Fusion", 2012 IEEE International Conference on Robotics and Automation, May 14-18, 2012) (Year: 2012).*

(Continued)

*Primary Examiner* — Amara Abdi
(74) *Attorney, Agent, or Firm* — Slater Matsil, LLP (57) ABSTRACT

The method of determination of a depth map of a scene comprises generation of a distance map of the scene obtained by time of flight measurements, acquisition of two images of the scene from two different viewpoints, and stereoscopic processing of the two images taking into account the distance map. The generation of the distance map includes generation of distance histograms acquisition zone by acquisition zone of the scene, and the stereoscopic processing includes, for each region of the depth map corresponding to an acquisition zone, elementary processing taking into account the corresponding histogram.

15 Claims, 4 Drawing Sheets

Related U.S. Application Data continuation of application No. 15/692,794, filed on Aug. 31, 2017, now Pat. No. 10,445,892.

(51) Int. Cl.

| | | |
|---|---|---|
| *G06T 7/55* | (2017.01) | |
| *G06T 7/593* | (2017.01) | |
| *H04N 13/207* | (2018.01) | |
| *H04N 13/254* | (2018.01) | |
| *H04N 13/271* | (2018.01) | |
| *H04N 13/00* | (2018.01) | |
| *H04N 13/204* | (2018.01) | |

(52) U.S. Cl.
CPC ......... *H04N 13/207* (2018.05); *H04N 13/254* (2018.05); *H04N 13/271* (2018.05); *G06T 2207/10012* (2013.01); *G06T 2207/10021* (2013.01); *G06T 2207/10028* (2013.01); *G06T 2207/20212* (2013.01); *H04N 2013/0081* (2013.01); *H04N 13/204* (2018.05)

(58) Field of Classification Search
CPC . G06T 2207/10028; G06T 2207/20212; G01S 17/08; H04N 13/207; H04N 13/254; H04N 13/271; H04N 13/204; H04N 2013/0081

See application file for complete search history.

(56) References Cited

U.S. PATENT DOCUMENTS

| | | | |
|---|---|---|---|
| 2013/0077853 A1* | 3/2013 | Chauvier | .................. G06T 3/40 382/154 |
| 2014/0362179 A1 | 12/2014 | Lee | |
| 2015/0041625 A1 | 2/2015 | Dutton et al. | |
| 2015/0287192 A1* | 10/2015 | Sasaki | .................. H04N 23/56 382/128 |
| 2016/0195610 A1 | 7/2016 | Hudman et al. | |
| 2017/0328731 A1 | 11/2017 | Clynne et al. | |
| 2018/0059679 A1* | 3/2018 | Taimouri | .................. G06N 3/08 |
| 2018/0247422 A1 | 8/2018 | Alibay et al. | |
| 2019/0385320 A1 | 12/2019 | Alibay et al. | |

FOREIGN PATENT DOCUMENTS

| | | |
|---|---|---|
| CN | 104883946 A | 9/2015 |
| CN | 207835674 U | 9/2018 |
| WO | 2016196414 A1 | 12/2016 |

OTHER PUBLICATIONS

Heiko, (Stereo Processing by Semiglobal Matching and Mutual Information, IEEE Transactions on Pattern Analysis and Machine Intelligence, vol. 30, No. 2, Feb. 2008) (Year: 2008).*
Nair et al, (High Accuracy TOF and Stereo Sensor Fusion at Interactive Rates, Springer-Verlag Berlin Heidelberg 2012) (Year: 2012).*
Gandhi, Vineet, et al., "High-Resolution Depth Maps Based on TOF-Stereo Fusion", 2012 IEEE International Conference on Robotics and Automation, Saint Paul, Minnesota, USA, May 14-18, 2012, pp. 4742-4749.
Nair, Rahul, et al., "A Survey on Time-of-Flight Stereo Fusion", Network and Parallel Computing LNCS Springer 2013, Germany, pp. 105-127.
Stmicroelectronics, "New generation Time-of-Flight Ranging sensor with advanced multi-zone and multi-object detection", VL53L1a FlightSense product, Doc ID 030299, Rev. 2, Feb. 2017, pp. 1-3.
Hirschmuller, Heiko, "Stereo Processing by Semiglobal Matching and Mutual Information", IEEE Transactions on Pattern Analysis and Machine Intelligence, vol. 30, No. 2, Feb. 2008, pp. 328-341.
Gudmundsson, Sigurjon Arni et al., "Fusion of stereo vision and time-of-flight imaging for improved 3D estimation," International Journal of Intelligent Systems Technologies and Applications, 2008, vol. 5, No. 3-4, 9 pages.
Nair, Rahul et al., "High accuracy TOF and stereo sensor fusion at interactive rates," European Conference on Computer Vision, Springer Berlin Heidelberg, 2012, 10 pages.

* cited by examiner

METHOD AND APPARATUS FOR DEPTH-MAP ESTIMATION OF A SCENE

CROSS-REFERENCE TO RELATED APPLICATIONS

This application is a divisional application of U.S. patent application Ser. No. 16/548,138, filed on Aug. 22, 2019, which is a continuation application of U.S. patent application Ser. No. 15/692,794, filed on Aug. 31, 2017, which claims priority to French Patent Application No. 1751539, filed on Feb. 27, 2017, which applications are hereby incorporated herein by reference.

TECHNICAL FIELD

Embodiments concern the determination of a depth map by combined stereoscopy and time of flight measurement.

BACKGROUND

A depth map is a digital representation of the distances between the positions of various objects of a scene and a receiver, the rendition of which is comparable to a photograph bearing depth information and not brightness information.

Various techniques exist for acquisition or determination of a depth map, for example, stereoscopy and time of flight measurement.

Time of flight measurement consists in emitting onto a scene an identifiable electromagnetic wave signal, generally pulsed laser illumination, and detecting the signals reflected by the objects of the scene. The time difference between the moment of emission of a signal and the moment of reception of that signal reflected by an object of the scene enables calculation of the distance separating the transmitter-receiver from the object.

For its part, stereoscopy is a so-called passive measurement technique and enables determination of a depth map of a scene from two photographic images of the scene taken from different viewpoints.

Figure 1:
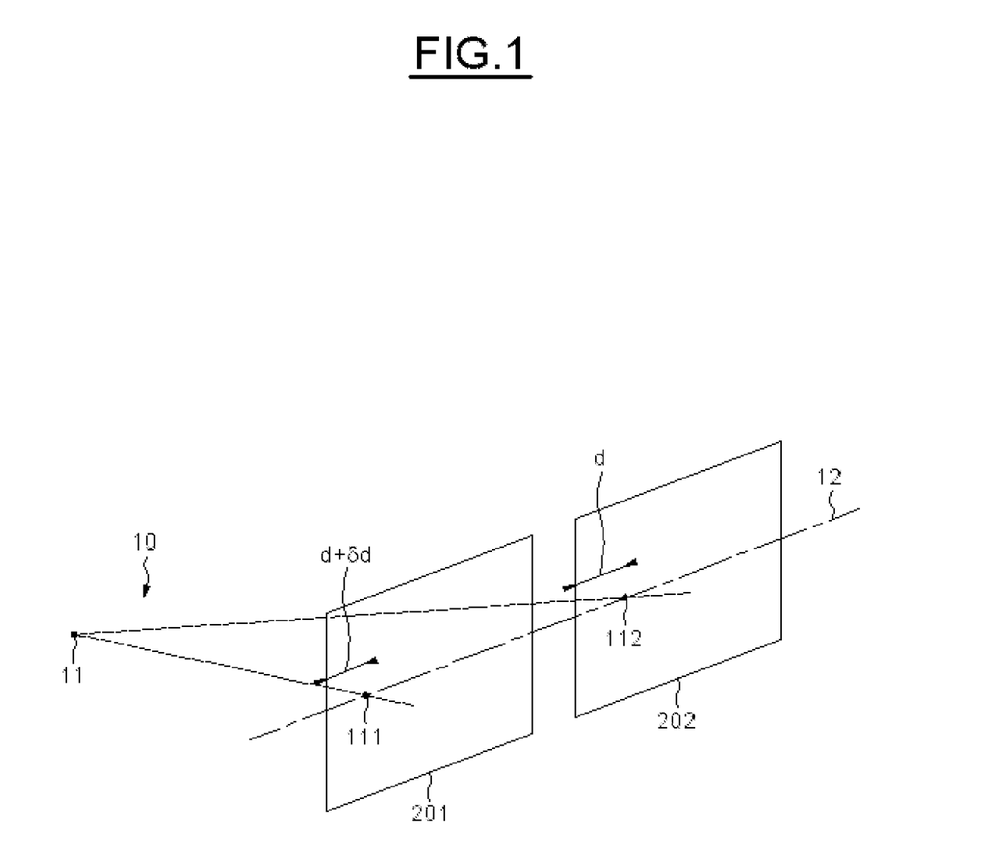
FIG. 1, described above, illustrates the principle of determination of depths by stereoscopy.

FIG. 1 illustrates the principle of determination of depths by stereoscopy. Two images 201, 202 of the same scene 10 including an object 11 are obtained from different known viewpoints, for example, by means of image sensors including optics. The two viewpoints usually have a parallel optical axis and are aligned horizontally to correspond to a left image 201 and a right image 202 separated by a so-called fundamental deviation.

The parallax resulting from the fundamental deviation means that the object 11 is projected into the images 201, 202 at respective different positions 111, 112. The projections 111, 112 are situated on the same epipolar line 12 that is typically horizontal for viewpoints situated in the same plane with vertically aligned receiving surfaces and parallel optical axes.

The determination of the distance between the receiver and the object 11, i.e., the depth of the object 11, therefore includes for each point of the image 201 a calculation of similarity with the points of the image 202 situated on the same epipolar line 12. The distance δd between the positions of the similar points of the two images 201, 202 is referred to as the disparity. The value of the disparity δd between the two projections 111, 112 enables extrapolation of the depth of the corresponding object 11, notably taking into account the fundamental deviation and optical and technological characteristics of the acquisition device.

The techniques for identification of similarities between the projections and of extrapolation of depths from disparities generally include an undersampled initialization calculation, a less sampled calculation exploiting the initialization and refining processing in order to obtain a correspondence by a so-called decreasing granularity method. These techniques are notably described in more detail in the scientific paper: HIRSCHMULLER, Heiko, *Stereo processing by semi global matching and mutual information*, IEEE Transactions on pattern analysis and machine intelligence, 2008, vol. 30, no 2, p. 328-341.

The calculations employed in the usual forms of stereoscopic processing therefore require a large amount of calculation resource leading to long execution times and sometimes to errors.

Merging the time of flight measurement and stereoscopy technologies can make it possible to limit and to refine the usual forms of stereoscopic processing.

For example, it is possible to produce an a posteriori estimate of the depth map using both the time of flight measurement and the stereoscopic image or to initialize stereoscopic processing with depth information obtained by time of flight measurement using one or more time of flight (ToF) sensors, for example, in place of undersampled processing. Moreover, it is also possible to calculate each disparity value taking into account depth variations measured by time of flight.

This type of combination of technologies is notably described in more detail in the scientific paper: Vineet Gandhi, Jan Cech, Radu Horaud. *High-Resolution Depth Maps Based on TOF-Stereo Fusion*, ICRA 2012—IEEE International Conference on Robotics and Automation, May 2012, Saint-Paul, Minnesota, United States. IEEE, pp. 4742-4749, 2012.

It should be remembered that a time of flight sensor enables measurement of the distance between an object and the sensor by measuring the time difference between the emission of a signal and the reception of that signal after it has been reflected by the object.

Current combinations of stereoscopic determination and time of flight measurement techniques necessitate extremely good mutual calibration and pixel to pixel matching between the stereoscopic images and the time of flight measurement. In other words, a high-resolution time of flight sensor, for example, one using a minimum of 25 kilopixels, is required to effect these depth map determination improvements.

Now, high-resolution time of flight sensors are bulky and greedy in terms of energy and calculation resources, which is generally undesirable. They are also costly. Finally, these inconveniences are notably incompatible with the compact and battery-powered autonomous on-board technologies that are increasingly commonly used.

There nevertheless exist time of flight sensors of lower resolution compatible with the requirements of autonomous on-board technology. Moreover, they are less costly than the high-resolution competition.

This type of time of flight sensor is very compact, autonomous and economic in energy (notably consuming less than 20 W on standby and less than 35 mW in operation). This type of sensor measures a distance map in which the depths are obtained acquisition zone by acquisition zone, for example, in accordance with a matrix of 5*3 zones or 15*9 zones of a scene equivalent image. A distribution of the depths of the objects present in the corresponding part of the scene is generated in the form of a histogram for each acquisition zone.

Accordingly, compared to high-resolution time of flight sensor technologies, the information obtained by this type of sensor is less precise but can be integrated into a processing subsystem of an autonomous or on-board system.

There exists a requirement to improve stereoscopic processing with the assistance of such time of flight measurements obtained with a sensor compatible with an autonomous or on-board technology in a simple and efficient manner.

SUMMARY

Embodiments of the invention utilize a distance map of the above kind including histograms of distances acquisition zone by acquisition zone to optimize a determination of a depth map obtained by stereoscopic acquisition in an autonomous or on-board system.

According to one aspect, a method of determination of a depth map of a scene comprises generating a distance map of the scene obtained by time of flight measurements. The two images of the scene are acquired from two different viewpoints, and stereoscopic processing of the two images takes into account the distance map. According to one general feature of this aspect, the generation of the distance map includes generation of distance histograms per acquisition zone of the scene, and the stereoscopic processing includes, for each region of the depth map corresponding to an acquisition zone, elementary processing taking into account the corresponding histogram.

References to a match between a region of the depth map and an acquisition zone mean, for example, that the regions and zones include the distance information of the same part of the scene. In fact, it is possible to establish geometrical relations, depending on the conditions of the various acquisitions and measurements, such as the positions of the viewpoints and the optical conditions.

The method according to this aspect therefore enables acquisition of an improved spatial understanding of a scene in a manner compatible with autonomous or on-board technologies.

This spatial understanding can, for example, be exploited in the context of adaptive management of a photographic flash and/or very efficient automatic focusing, at the same time as optimizing the determination of the depth map of a scene.

The stereoscopic processing may include extrapolation of the distances of the scene from disparities between the two images.

For example, the elementary processing limits the calculations of the extrapolation (for example, reduces the amount of calculations and the calculation time of the extrapolation) and/or enhances the reliability of the result of the extrapolation (for example, enables errors to be avoided) and/or adds additional depth information to the extrapolation of the distances of the scene in the depth map.

Notably in order to be implemented in autonomous or on-board technologies, the resolution of the depth map can be at least one thousand times greater than the resolution of the distance map measured by time of flight, the resolution of the distance map measured by time of flight being equal to the number of acquisition zones.

Again for example, the distance map of the scene obtained by time of flight measurements may include from ten to one thousand acquisition zones.

Advantageously, the respectively maximum distance and/or minimum distance measurable by time of flight are respectively greater than and/or less than a stereoscopic range ceiling value and/or a stereoscopic range floor value.

The stereoscopic range ceiling value corresponds to the maximum distance that can be extrapolated in the stereoscopic processing and the stereoscopic range floor value corresponds to the minimum distance that can be extrapolated in the stereoscopic processing.

These stereoscopic range ceiling and floor values notably depend on the fundamental deviation between the positions of the viewpoints of the two images of the scene.

According to one embodiment, the elementary processing includes, if necessary, identification of at least one region of the depth map, termed an out-of-range region, the corresponding histogram of which does not include any distance respectively less than the stereoscopic range ceiling value and/or greater than the stereoscopic range floor value, the extrapolation then not being effected in the at least one out-of-range region.

This embodiment makes it possible to limit the extrapolation calculations by avoiding the use of calculations that are of no utility in zones previously detected as being out-of-range (which would not have produced any result by stereoscopic extrapolation).

The elementary processing advantageously includes assigning a default depth to the at least one out-of-range region, the default depth being obtained from the distances of the corresponding histogram.

For example, the default distance can be equal to or greater than the greatest distance of the corresponding histogram or the mean or median distance of the corresponding histogram or a value chosen from the distances according to other criteria.

This enables addition to the depth map of depth information additional to that obtained by stereoscopic extrapolation.

The elementary processing may include assigning a constant depth respectively to at least one region of the depth map, termed a plane region, the corresponding histogram of which includes a single group of distances the mid-height width of which is less than a threshold width, the constant depth being equal to a distance from the single group and the extrapolation then not being effected in the at least one plane region.

This also makes it possible to avoid the use of extrapolation calculations in a region including a substantially plane surface substantially perpendicular to the viewpoint of the image acquisitions and time of flight measurement and possibly not including any texture (any detail) making it possible to extrapolate a disparity or including repetitive patterns, sources of disparity calculation errors.

Moreover, this also enables addition to the depth map of depth information additional to that obtained by stereoscopic extrapolation.

According to one embodiment, the elementary processing includes generation of a range of disparity values region by region from extreme values of the distances of the corresponding histogram and the extrapolation of the distances of the scene is effected region by region from disparity values included in the corresponding range.

This embodiment makes it possible to limit the calculations employed for the extrapolation in the stereoscopic processing by limiting the identification of the disparities in a range obtained previously by means of the time of flight measurements histogram.

Moreover, the disparity values included in the corresponding range may be taken according to an increment corresponding to the precision of the time of flight measurement, commensurately limiting the amount of calculation for the distance extrapolation in the stereoscopic processing.

Moreover, this embodiment makes it possible to enhance the reliability of the extrapolation calculations by avoiding common errors in the case of uniform textures or repetitive patterns in the scene.

According to one embodiment, the elementary processing includes determination of the distributions region by region of the distances obtained by the extrapolation and comparison of the contours of the distance histograms acquisition zone by acquisition zone with the contours of the distributions of the distances region by respective region, the comparison producing a level of concordance.

In other words, this embodiment includes comparison of the depth histograms obtained by stereoscopy and by time of flight measurement and enables the provision by means of the level of concordance of information as to the quality and reliability of the depth map.

According to another aspect, a device for determination of a depth map of a scene comprises a time of flight sensor configured to generate a distance map of the scene, a stereoscopic image acquisition device configured to acquire two images of the scene at two different viewpoints, and a stereoscopic processor configured to effect stereoscopic processing of the two images taking into account the distance map. According to one general feature of this aspect, the time of flight sensor is configured to generate distance histograms acquisition zone by acquisition zone of the scene and the stereoscopic processor includes an elementary processor configured, for each region of the depth map corresponding to an acquisition zone, to effect elementary processing taking into account the corresponding histogram.

The stereoscopic processor may be configured to effect stereoscopic processing including extrapolation of the distances of the scene from disparities between the two images.

For example, the elementary processor may be configured to limit the extrapolation calculations and/or to enhance the reliability of the result of the extrapolation and/or to add additional depth information to the extrapolation of the distances of the scene in the depth map.

The resolution of the stereoscopic image acquisition device may be at least one thousand times greater than the resolution of the time of flight sensor, the resolution of the time of flight sensor being equal to the number of acquisition zones.

For example, the time of flight sensor includes from ten to one thousand acquisition zones.

The maximum distance and/or minimum distance measurable by the time of flight sensor are advantageously respectively greater than and/or less than a stereoscopic range ceiling value and/or a stereoscopic range floor value that can be extrapolated by the stereoscopic processor.

According to one embodiment, the elementary processor is configured in order, if necessary, to identify at least one region of the depth map, termed an out-of-range region, the corresponding histogram of which does not include any distance less than a stereoscopic range threshold value, the stereoscopic processor being further configured not to effect the extrapolation in the at least one out-of-range region.

The elementary processor is advantageously configured to assign a default depth to the at least one out-of-range region, the default depth being obtained from the distances of the corresponding histogram.

The elementary processor may also be configured to assign a respective constant depth to at least one region of the depth map, termed a plane region, the corresponding histogram of which includes a single group of distances the mid-height width of which is less than a threshold width, the constant depth being equal to a distance from the single group, the stereoscopic processor being further configured so as not to effect the extrapolation in the at least one plane region.

According to one embodiment, the elementary processor is configured to generate a range of disparity values region by region from the extreme values of the distances of the corresponding histogram and the stereoscopic processor is configured to effect the extrapolation of the distances of the scene region by region based on disparity values included in the corresponding range.

The stereoscopic processor is advantageously configured to effect the extrapolation of the distances of the scene region by region based on disparity values with an increment corresponding to the precision of the time of flight measurement.

According to one embodiment, the elementary processor is configured to determine distributions region by region of the distances obtained by the extrapolation and to compare contours of the distance histograms acquisition zone by acquisition zone with the contours of the distributions of the distances per respective region, the comparison producing a level of concordance.

There is also proposed an electronic device, such as a still camera, a mobile telephone or a touch-screen tablet, including a device as defined hereinabove for the determination of a depth map.

BRIEF DESCRIPTION OF THE DRAWINGS

Other advantages and features of the invention will become apparent on examining the detailed description of non-limiting embodiments and the appended drawings, in which.

DETAILED DESCRIPTION OF ILLUSTRATIVE EMBODIMENTS

Figure 2:
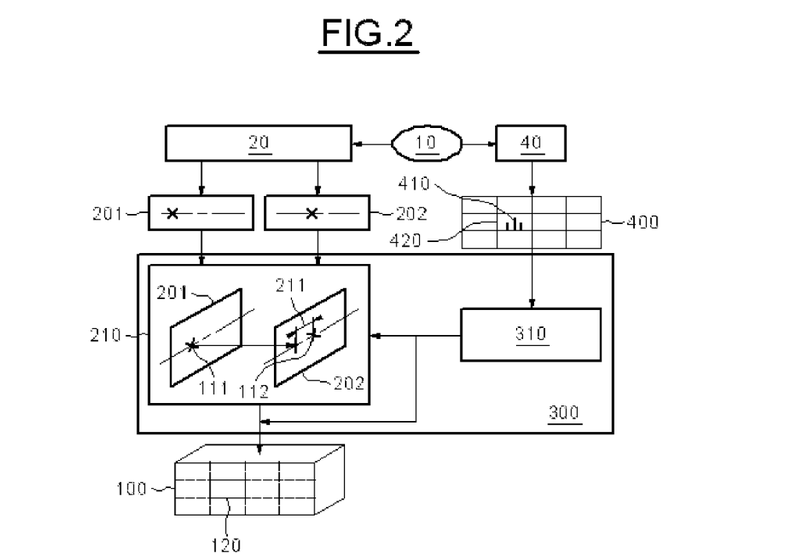
FIGS. 2 to 6 represent embodiments of the invention.

FIG. 2 shows one embodiment of a method of determination of a depth map of a scene 10 by collaboration of stereoscopic and time of flight acquisitions.

Stereoscopic acquisition involves acquisition of two images 201, 202 of the scene 10 from two different viewpoints.

The respective projections 111 and 112 of the same object-point of the scene 10 consequently feature a parallax, i.e., a deviation between their relative positions in the images 201, 202, also termed the disparity 211.

Also, the method includes generation of a distance map 400 obtained by time of flight measurement.

The generation of the distance map 400 of the scene 10 moreover includes a time of flight measurement, i.e., a measurement of the time elapsed between the emission of a light signal onto the scene and the reception of that signal when reflected. This time measurement is proportional to the distance between an emitter-receiver 40 and the various objects of the scene 10, which distance is also referred to as the depth of the various objects of the scene.

This measurement is effected for from 10 to 500 acquisition zones 420 in accordance with a matrix distribution in the field of view of the emitter-receiver 40.

Geometrical relations between the positions of the viewpoints of the two images 201, 202 and the viewpoint of the time of flight measurement on the one hand and the optical characteristics such as the field of view and the distortions of the various acquisitions on the other hand make it possible to establish precise matches of the various acquisition zones 420 with regions 120 of a depth map 100. In other words, to each acquisition zone 420 of the time of flight measurement there corresponds a region 120 of the depth map.

In some time of flight measurement devices, also known as "time of flight sensors", the distribution of the distances in each acquisition zone 420 is communicated in the form of a histogram 410 in addition to an overall measurement of the distance to the zone.

The generation of the distance map 400 therefore includes generation of a distance histogram 410 for each acquisition zone 420 of the scene.

Moreover, stereoscopic processing 300 is employed, including extrapolation 210 of the distances of the scene from the disparities 211 between the two images 201, 202.

The stereoscopic processing 300 includes elementary processing 310 before, during and/or after the distance extrapolation 210.

For each region 120 of the depth map 100 corresponding to an acquisition zone 420 the elementary processing 310 takes into account the histogram 410 of the acquisition zone 420 and notably makes it possible to limit and/or to improve the reliability of the result of the extrapolation 210 and/or to add depth information additional to that obtained by the extrapolation 210.

According to a first example, the elementary processing 310 advantageously exploits on the one hand the fact that the maximum distance that can be measured by time of flight measurement is generally greater than a stereoscopic range ceiling value 312 corresponding to the maximum identifiable distance in the extrapolation 210 of the distances of the scene and on the other hand the fact that that minimum distance measurable by time of flight measurement is generally less than a stereoscopic range floor value 313 corresponding to the minimum identifiable distance in the extrapolation 210 of the distances of the scene.

Figure 3:
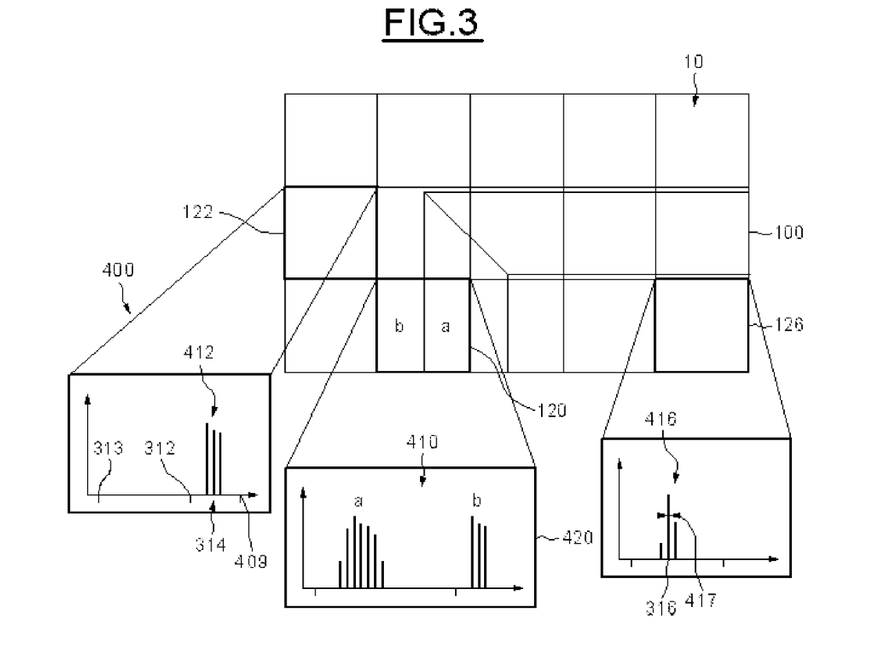

As shown in FIG. 3, the elementary processing 310 therefore includes identification of the acquisition zones for which a corresponding histogram 412 does not include any distance below a stereoscopic range threshold 312, these acquisition zones then being referred to as out-of-range zones 122.

In fact, the disparity in stereoscopy is proportional to the reciprocal of the depth of the corresponding object. At a sufficiently great distance a disparity will therefore no longer be detectable, an optical object situated at infinity introducing no parallax.

Moreover, at sufficiently small distances, an object can introduce a disparity value that is undetectable because it is greater than a maximum disparity or because of optical distortion caused by the viewing angle.

For this example and hereinafter it is to be understood that an expression of the type "the histogram does not include any distance less than a ceiling value" must be understood as meaning "the histogram does not include any distance less than a ceiling value by an amount sufficient to be pertinent." In fact, in time of flight sensors uniform noise levels can be present at all distances and spurious occlusions can introduce a limited number of erroneous measurements in the histograms.

For example, for a fundamental deviation of 12 mm between the respective viewpoints of the images 201 and 202 and with a resolution of 12 megapixels, the stereoscopic range ceiling value 312 can be from approximately 1.5 meters to approximately 2.5 meters, whereas the maximum range of the time of flight measurement can be greater than 4 meters. For its part, the minimum range of the time of flight measurement can be equal to or very close to 0 meter.

The elementary processing 310 also involves the identification of the corresponding regions 122 termed out-of-range regions.

Therefore, the extrapolation 210 is then not done in the identified out-of-range region(s) 122, where appropriate (in fact it is not possible for there to be no out-of-range region in the scene 10).

Moreover, the elementary processing 310 advantageously includes assigning a default depth 314 obtained from the distances of the corresponding histogram 412 to the at least one out-of-range region 122.

For example, the default depth can be equal to or greater than the greatest distance from the corresponding histogram 412 or equal to the mean value of the distances of the corresponding histogram 412, the median value of the distances of the corresponding histogram 412 or the distance from the corresponding histogram 412 having the largest population.

Thus in this first example the elementary processing 310 is done before the extrapolation 210 of distances and makes it possible on the one hand to economize on calculation time and resources and on the other hand to add depth information to regions 122 of the depth map that would not have any such information without the time of flight measurement.

The elementary processing 310 can also include assigning a constant depth 316 to a region 126 termed a plane region. The constant depth 316 is obtained from a histogram 416 representing a measurement of a substantially plane surface substantially perpendicular to the measurement optical axis.

A histogram 416 representing a situation of this kind includes a single distance measurement or substantially a single distance measurement, i.e., it is a histogram including a single group of distances the mid-height width 417 of which is below a threshold width. The threshold width may be, for example, less than five distance ranges or five bars of the histogram.

The constant depth 316 may be chosen as the measured largest population distance or the mean value or the median value from the histogram 416.

Because of the reliability of a measurement of this kind as to the plane nature of the part of the scene corresponding to the corresponding acquisition zone 426, the extrapolation 210 is not needed. Nevertheless, if the group of distances 416 representing a plane surface is not the only measurement present in the histogram (in the sense of measurements obtained in an insufficient quantity to be pertinent), then it will be necessary to carry out the extrapolation 210 in the corresponding region.

Figure 4:
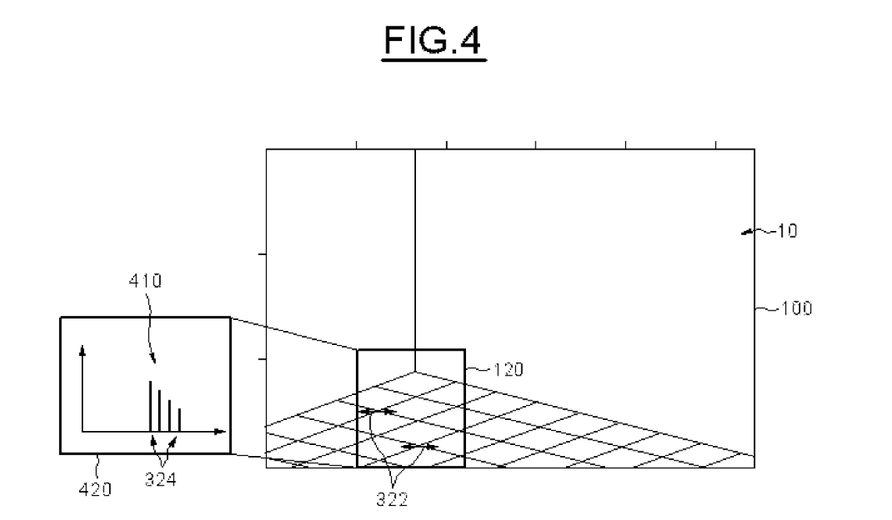

FIG. 4 shows a second embodiment of the elementary processing 310 enabling improvement of the stereoscopic processing 300.

In this second embodiment, the elementary processing 310 isolates the extreme values 324 of the distances present in the histograms 410 of the various acquisition zones 420.

These extreme distance values 324 are translated into extreme disparity values that form a possible range 322 of disparity values for any point of the corresponding region 120.

In fact, as a disparity value can be extrapolated to a depth, a depth measurement enables calculation of the equivalent disparity.

This possible range of disparity values 322 therefore enables use of the extrapolation 210 of the distances of the scene over disparity values limited to this range 322 of possible disparity values.

In other words, the elementary processing 310 includes in this example the generation of a range of disparity values 322 region by region from extreme values 324 of the distances from the corresponding histogram 410. The extrapolation 210 of the distances of the scene is then done for each region based on disparity values 211 included in the corresponding range 322.

This embodiment is advantageous on the one hand in terms of the amount of calculation used in each extrapolation 210 of the distances of the scene 10 per region 420.

On the other hand, this embodiment makes it possible to enhance the reliability of the determination of the depth map, notably under conditions of a surface without texture or a surface with repetitive patterns, for which the identification of the projections 111, 112 of the same object 11 of the scene is difficult and often leads to errors.

Moreover, the resolution (in the sense of the quantisation step) of a time of flight measurement is constant relative to the distance of the measured object.

On the other hand, the disparity values are proportional to the reciprocal of the corresponding distance. An elementary disparity variation will therefore induce a resolution (in the sense of the quantization step) of the estimated distance of decreasing accuracy as the distance of the measured object increases.

Therefore, thanks to the range 322 of possible disparity values, it is possible to evaluate a disparity step corresponding to the accuracy of the time of flight measurement, for example, 2 cm, for the range 324 of measured distances. The match between the two projections 111, 112 of the same object 11 in the two images 201, 202 will then be achieved in accordance with this disparity step, enabling optimisation of the extrapolation calculations region by region 120 for a given order of magnitude of distance.

Figure 5:
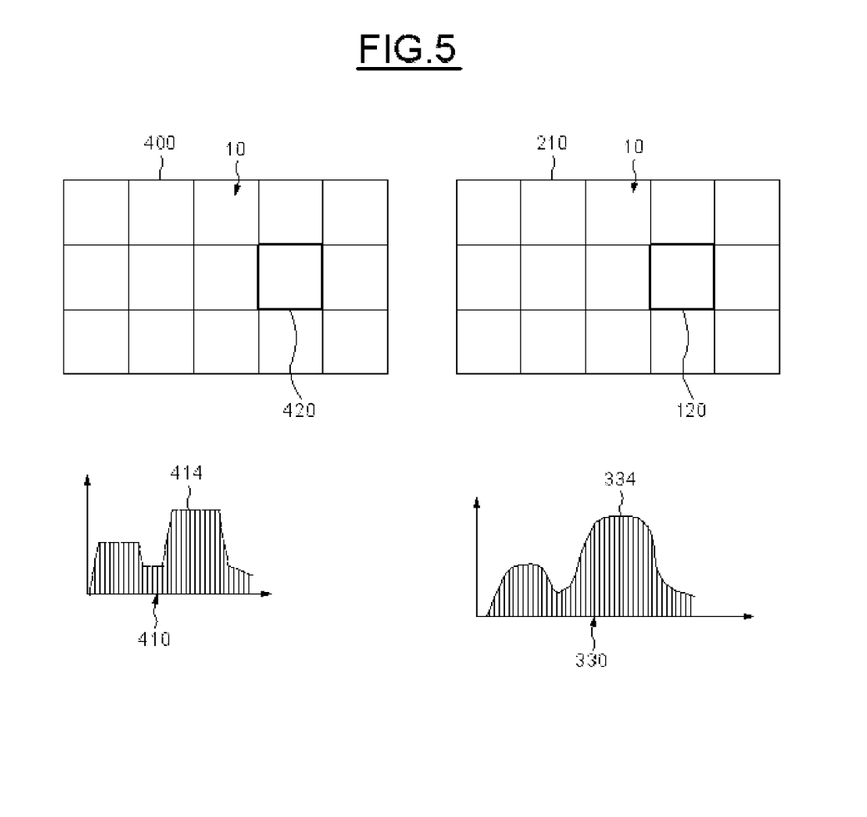

FIG. 5 shows a third embodiment of the elementary processing 310 enabling improvement of the stereoscopic processing 300.

In this embodiment the depth information obtained by stereoscopy and by time of flight measurement is compared in order to generate a measurement evaluation criterion, in this instance a level of concordance between two histogram contours.

The elementary processing 310, here carried out after the stereoscopic extrapolation 210 of depths, therefore reconstructs region 120 by region a histogram 330 of the extrapolated distances.

For each acquisition zone 420 and corresponding region 120, the contour 334 of the histogram 330 of the extrapolated distances is compared to the contour 414 of the histogram 410 of the distances generated by time of flight measurement. Here by contour is to be understood an envelope of the histogram that can be obtained by interpolation of the values. This makes it possible to circumvent the different resolutions of the histograms 330 and 410.

This comparison can, for example, be carried out by means of a standard comparison method, such as the least squares method.

The result of the comparison yields a level of concordance that enables evaluation of the similarity between the two types of depth measurement for the same scene.

A level of concordance close to 1 bears witness to successful stereoscopic processing whereas a level of concordance below a concordance threshold bears witness to a divergence between the two measurement methods and therefore a relatively unreliable depth map.

Figure 6:
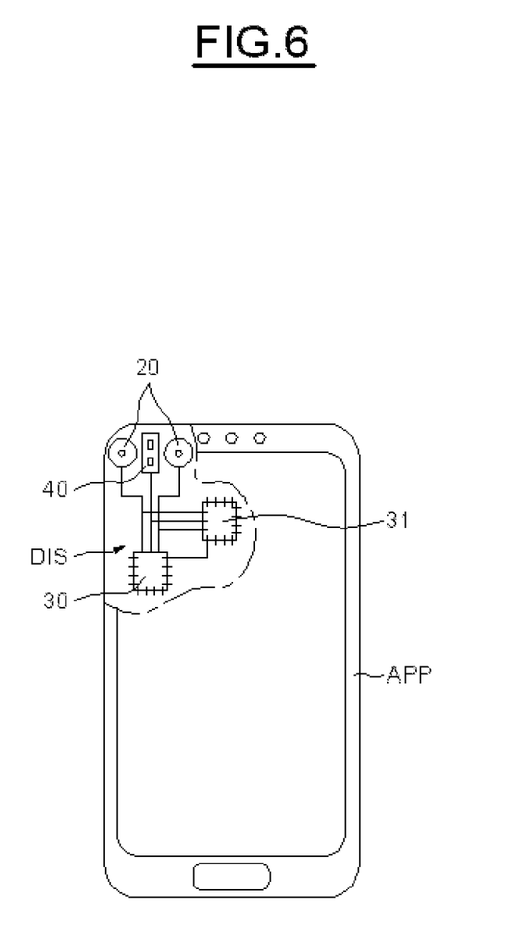

FIG. 6 shows an electronic device APP, here a mobile telephone or a touch-screen tablet, including a device DIS for determination of a depth map of a scene. The electronic device APP is advantageously a battery-powered portable device and the device DIS is, for example, included in an on-board stereoscopic acquisition and processing system.

The device DIS includes stereoscopic image acquisition device 20 configured to implement stereoscopic acquisition as described above, a time of flight sensor 40 configured to generate a distance map 400 of the scene in a manner such as described above, a stereoscopic processor 30 configured to implement the stereoscopic processing 300 in a manner such as described above, and elementary processor 31 configured to implement the elementary processing 310 in a manner such as described above.

For example, the stereoscopic acquisition device 20 includes two lenses with a focal length between 20 mm and 35 mm inclusive, a field of view between 60° and 80° inclusive, and parallel optical axes, as well as two 12 megapixel image sensors defining two viewpoints aligned horizontally and spaced by a fundamental deviation of 12 mm.

For example, the time of flight sensor 40 is between the two viewpoints and is of the compact all-in-one sensor type. The time of flight sensor 40 can function in the infrared spectrum at 940 mm, have a field of view compatible with that of the stereoscopic acquisition device 20, a range of 3.5 m, an accuracy of 2 cm, low energy consumption (20 W when idle and 35 mW in operation), a matrix of 5*3 acquisition zones or 15*9 acquisition zones, and an autonomous 32-bit calculation unit.

The stereoscopic processor 30 and the elementary processor 31 can optionally be integrated into the same microcontroller type calculation unit integrated circuit.

Moreover, the invention is not limited to these embodiments but encompasses all variants thereof, for example, the various embodiments described above can be adapted to the constraints of a particular stereoscopic processing and can moreover be combined with one another. Moreover, the quantitative information given, such as that relating to the performance of the various equipment, is given by way of example in the framework of a definition of a technological context.

What is claimed is:

1. A device comprising:
   a time of flight sensor configured to generate a distance map of a scene, the time of flight sensor being configured to generate a corresponding distance histogram for each acquisition zone of the scene; and
   a stereoscopic image acquisition device configured to acquire two images of the scene at two different viewpoints, wherein the device is configured to
   identify regions of a depth map to be generated from the two images that corresponds to the distance map,
   generate a range of values of disparities, region by region, from extreme values of the distances of the corresponding histogram, and
   extrapolate distances of the scene from the disparities between the two images, wherein, for each region, the extrapolation of the distances of the scene is performed based on the range of values of the disparities for a corresponding region.

2. The device of claim 1, wherein the device comprises a stereoscopic processor and an elementary processor configured to cause the device to identify the regions, generate the range of disparity values, and extrapolate the distances.

3. The device of claim 1, wherein the depth map has a resolution that is at least one thousand times greater than a resolution of the distance map measured by time of flight, the resolution of the distance map measured by time of flight being equal to a total number of acquisition zones.

4. The device of claim 1, wherein the distance map of the scene obtained by time of flight measurements includes from ten to one thousand acquisition zones.

5. The device of claim 1, wherein the device comprises a camera, a mobile telephone, or a touchscreen tablet.

6. A method for determining a depth map of a scene, the method comprising:
generating, at a time of flight sensor, a distance map of a scene, the time of flight sensor being configured to generate a corresponding distance histogram for each acquisition zone of the scene; and
acquiring, at a stereoscopic image acquisition device, two images of the scene from two different viewpoints;
identifying, at the stereoscopic image acquisition device, regions of a depth map to be generated from the two images that corresponds to the distance map;
generating, at the stereoscopic image acquisition device, a range of values of disparities, region by region, from extreme values of the distances of the corresponding histogram; and
extrapolating, at the stereoscopic image acquisition device, distances of the scene from the disparities between the two images, wherein, for each region, the extrapolating of the distances of the scene is performed based on the range of values of the disparities for a corresponding region.

7. The method of claim 6, further comprising identifying, using a stereoscopic processor and an elementary processor, the regions, generate the range of disparity values, and extrapolate the distances.

8. The method of claim 6, wherein the depth map has a resolution that is at least one thousand times greater than a resolution of the distance map measured by time of flight, the resolution of the distance map measured by time of flight being equal to a total number of acquisition zones.

9. The method of claim 6, wherein the distance map of the scene obtained by time of flight measurements includes from ten to one thousand acquisition zones.

10. The method of claim 6, wherein the time of flight sensor and the stereoscopic image acquisition device are integrated in a device, wherein the device comprises a camera, a mobile telephone, or a touchscreen tablet.

11. A device comprising:
a time of flight sensor; and
a stereoscopic image acquisition device,
wherein the time of flight sensor is configured to generate a distance map of a scene and generate a corresponding distance histogram for each acquisition zone of the scene,
wherein the stereoscopic image acquisition device is configured to acquire two images of the scene at two different viewpoints, and
wherein the device comprises instructions, stored within a memory of the device, when executed causes the device to
identify regions of a depth map to be generated from the two images that corresponds to the distance map,
generate a range of values of disparities, region by region, from extreme values of the distances of the corresponding histogram, and
extrapolate distances of the scene from the disparities between the two images, wherein, for each region, the extrapolation of the distances of the scene is performed based on the range of values of the disparities for a corresponding region.

12. The device of claim 11, wherein the device comprises a stereoscopic processor and an elementary processor configured to cause the device to identify the regions, generate the range of disparity values, and extrapolate the distances.

13. The device of claim 11, wherein the depth map has a resolution that is at least one thousand times greater than a resolution of the distance map measured by time of flight, the resolution of the distance map measured by time of flight being equal to a total number of acquisition zones.

14. The device of claim 11, wherein the distance map of the scene obtained by time of flight measurements includes from ten to one thousand acquisition zones.

15. The device of claim 11, wherein the device comprises a camera, a mobile telephone, or a touchscreen tablet.

* * * * *